United States Patent
Drescher et al.

(10) Patent No.: US 6,922,738 B2
(45) Date of Patent: Jul. 26, 2005

(54) ATA/SATA COMBINED CONTROLLER

(75) Inventors: Henry Drescher, Dresden (DE); Frank Barth, Radebeul (DE)

(73) Assignee: Advanced Micro Devices, Inc., Sunnyvale, CA (US)

(*) Notice: Subject to any disclaimer, the term of this patent is extended or adjusted under 35 U.S.C. 154(b) by 203 days.

(21) Appl. No.: 10/259,710

(22) Filed: Sep. 27, 2002

(65) Prior Publication Data

US 2003/0191874 A1 Oct. 9, 2003

(30) Foreign Application Priority Data

Apr. 3, 2002 (DE) .......................................... 102 14 700

(51) Int. Cl.[7] .............................................. G06F 3/00
(52) U.S. Cl. .......................................... 710/20; 710/74
(58) Field of Search .............................. 710/8, 20, 38, 710/74, 62, 65, 71

(56) References Cited

U.S. PATENT DOCUMENTS

| | | | |
|---|---|---|---|
| 4,539,564 A | | 9/1985 | Smithson .................. 340/2.26 |
| 5,530,960 A | * | 6/1996 | Parks et al. .................... 710/5 |
| 5,596,562 A | | 1/1997 | Chen .......................... 710/315 |
| 5,905,885 A | * | 5/1999 | Richter et al. ................. 710/5 |
| 5,949,979 A | | 9/1999 | Snow et al. |
| 6,549,981 B2 | * | 4/2003 | McDonald et al. .......... 711/114 |
| 6,735,650 B1 | * | 5/2004 | Rothberg ..................... 710/74 |
| 6,845,420 B2 | * | 1/2005 | Resnick ...................... 710/303 |

OTHER PUBLICATIONS

"Silicon Image Debuts SATALink™ Family of End to End Serial ATA Solutions Including Industry's First Fully Integrated PCI-to-SATA Host Controller", Intel Developer Forum, San Francisco, CA, Feb. 25, 200.

"Adaptec Announces Serial ATA Controller for Next-Generation Storage Applications", Adaptect Inc., Milpitas, CA, Feb. 22, 2002.

Intel 82801 BA I/O Controller Hub 2(ICH2) Datasheet and Intel 82801 BAM I/O Controller Hub 2 Mobile (ICH2–M), Intel, Oct. 2000, pp. iii and V, chapter 1.2 Overview: pp. 1–3 and 1–8.

Maxtor: "Serial ATA", White Paper, 'Online!, Nov. 7, 2000, XP002317003, http://www.maxtor.com/_files/maxtor/en_us/documentation/white_papers/serial_ata_white_papers.pdf.

International search report application No. PCT/US03/06258, Mar. 1, 2005.

* cited by examiner

*Primary Examiner*—Jeffrey Gaffin
*Assistant Examiner*—Harold Kim
(74) *Attorney, Agent, or Firm*—Meyertons Hood Kivlin Kowert & Goetzel, P.C.; B. Noël Kivlin

(57) ABSTRACT

A combined ATA and SATA controller is provided that comprises a control unit for controlling data transfer to and/or from an ATA compliant parallel storage device and a control unit for controlling data transfer to and/or from an SATA compliant serial storage device. The controller can concurrently perform the data transfer to and/or from the parallel and serial devices. By reusing a significant amount of controller hardware, the combined controller can be realized in a cost effective manner.

24 Claims, 2 Drawing Sheets

ATA/SATA COMBINED CONTROLLER

BACKGROUND OF THE INVENTION

1. Field of the Invention

The invention generally relates to controlling data transfer to and/or from storage devices, and relates in particular to ATA (Advanced Technology Attachment) and SATA (Serial ATA) controllers.

2. Description of the Related Art

In computer systems, hard disks and other drives such as CD or DVD drives, tape devices, high capacity removeable devices, zip drives, and CDRW drives are storage devices that may be connected to the computer via an interface for defining the physical and logically requirements for performing data transfer to and from the devices. One of the most popular interfaces used in modern computer systems is the one most commonly known as IDE (Integrated Drive Electronics). The IDE drive interface, more properly called AT (Advanced Technology) Attachment (ATA) interface, was developed starting in 1986 and was standardized around 1988. The specification which provides a way to make disk drive "attachments" to the PC (Personal Computer) architecture, was further developed to a variety of more recent specifications such as ATA/ATAPI, EIDE, ATA-2, Fast ATA, ATA-3, Ultra ATA, Ultra DMA, ATA-4 and many more as well. All of these specifications define storage interfaces for connecting to parallel storage devices and are referred to as being ATA compliant hereafter.

While the parallel ATA interconnect has been the dominant internal storage interconnect for desktop and mobile computers because of its relative simplicity, high performance, and low cost, ATA compliant interfaces have a number of limitations that are exhausting their ability to continue increasing performance. Some of these limitations are the 5-volt signalling requirement, and the high pin count. These and other characteristics of parallel ATA interfaces are the reasons why such interfaces cannot scale to support several more speed doublings as happened in the past, so that this interface is nearing its performance capacity.

For this reason, and to provide scaleable performance for the next decade, serial ATA (SATA) was developed as a next generation ATA specification. SATA is an evolutionary replacement for the parallel ATA physical storage interface and is designed to be 100% software compatible with today's ATA, but to have a much lower pin count, enabling thinner, more flexible cables. Because of the maintained software compatibility, no changes in today's drivers and operating systems are required. Moreover, the lower pin count also benefits the system design of motherboards and their chipsets and other integrated silicon components.

As mentioned above, one of the key features of the SATA interface is the software compatibility to parallel ATA controllers. This can be better understood from a comparison of FIGS. 1 and 2 which illustrate standard ATA and the serial ATA (SATA) connectivity, respectively.

Turning first to FIG. 1 which depicts how ATA compliant parallel storage devices are connected to a computer system to enable data transfer to and from the devices, the computer system includes an operating system 115 that is the main software running on the computer. There may further be multiple application programs 100, 105, 110 which usually have a user interface for providing information to the user and receiving input. Of course, application programs with no user interface exist as well. Further, there is usually a driver software 120 provided which may be an extra software component, or part of the operating system 115, and which is run specifically to interact with ATA compliant hardware. This hardware includes the ATA adapter 125 which exchanges data signals with devices 135, 140 over a parallel port 130. The ATA adapter 125 is also called ATA controller, often together with the parallel port 130.

Referring now to FIG. 2 which illustrates the corresponding parts of a computer system having an SATA interface, there are no changes required in the application programs 100, 105, 110, the operating system 115, nor the driver 120. On the hardware side, an SATA adapter 200 is provided that is connected to one or more serial ports 210, 215 for exchanging signals with serial devices 220, 225. That is, the SATA enabled computer system differs from the system of FIG. 1 in that the devices and ports are serialized, and an appropriate SATA compliant adapter 200 is provided. Focusing in more detail to this adapter, it can be seen, that the SATA adapter 200 may be understood as comprising an ATA adapter 125, being accompanied with a parallel/serial converter 205 to perform parallel-to-serial and serial-to-parallel conversion of data signals.

As neither in the operating system 115 nor in the driver software 120 specific adaptations to the SATA specification are required, the interface of FIG. 2 is software compatible with the technique of FIG. 1. Thus, SATA is a drop-in solution, and today's software will run on the new architecture without modification. Given this feature and the above described other advantages, and further taking into account that SATA compliant controllers and devices will be of about the same costs as conventional units, SATA is expected to eventually completely replace parallel ATA interfaces. SATA's adoption by the industry will follow a phased transition path, and there will be a point where both parallel and serial ATA capabilities are available.

Although the technology is software compatible and operating system transparent, SATA electronics and connectors will differ from those of the conventional ATA interface. For this reason, adapters may be provided to facilitate forward and backward compatibility of hard disks and other storage devices on computer systems. For instance, SATA-to-ATA bridges may be used in hard disk drives and storage systems, and ATA-to-SATA bridges may be used in motherboards, add-in cards and drive test equipment. However, such conventional solutions require a significant amount of additional hardware components and thus lead to increased manufacturing costs.

SUMMARY OF THE INVENTION

In one embodiment, a control apparatus for controlling data transfer to and/or from storage devices is provided. The control apparatus comprises a first control unit for controlling data transfer to and/or an ATA compliant parallel storage device. Further, the control apparatus comprises a second control unit for controlling data transfer to and/or from an SATA compliant serial storage device. The control apparatus is capable of concurrently performing the data transfer to and/or from the parallel and serial devices.

In another embodiment, an integrated circuit chip is provided that comprises circuitry for performing data transfer to and/or from ATA and SATA devices. The integrated circuit chip comprises first control circuitry for controlling data transfer to and/or from an ATA compliant parallel storage device. Further, the integrated circuit chip comprises second control circuitry for controlling data transfer to and/or from an SATA compliant serial storage device. The first and second control circuitries are capable of concurrently performing the data transfer to and/or from the parallel and serial devices.

In a further embodiment, there may be provided a method of operating a control apparatus for controlling data transfer to and/or from storage devices. The method comprises performing data transfer to and/or from an ATA compliant parallel storage device connected to the control apparatus. The method further comprises performing data transfer to and/or from an SATA compliant serial storage device connected to the control apparatus. The data transfer to and/or from the ATA compliant parallel storage device and the data transfer to and/or from the SATA compliant serial storage device are performed concurrently.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
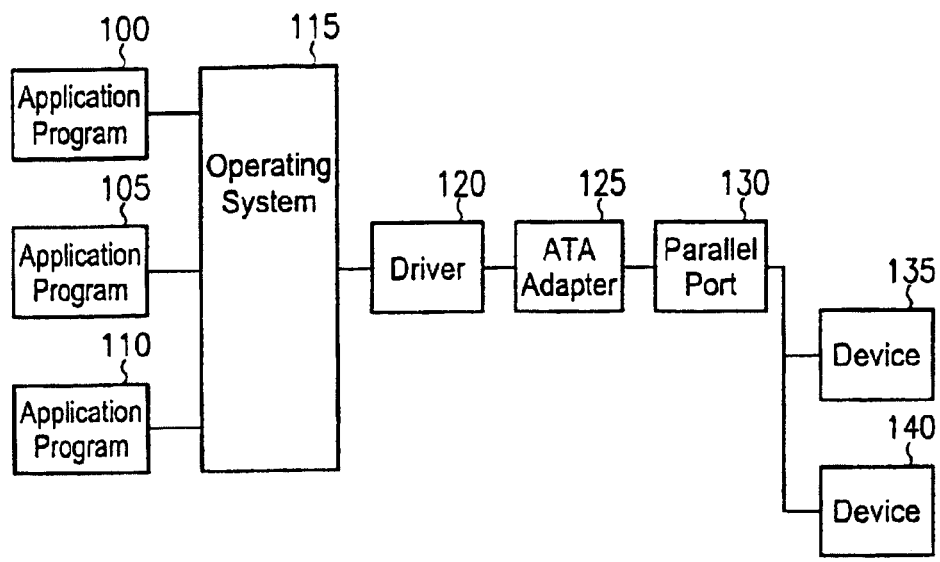
FIG. 1 illustrates a conventional computer system that is connected to ATA compliant storage devices.
Figure 2:
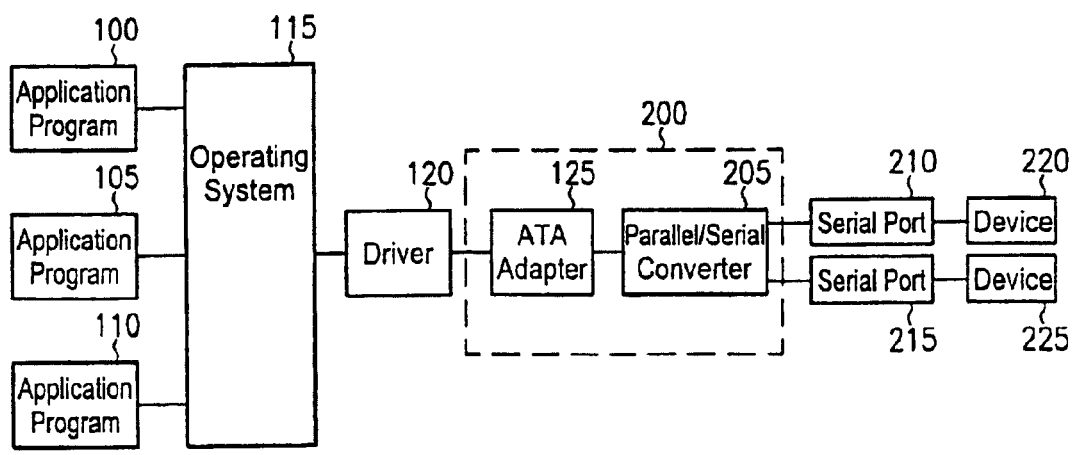
FIG. 2 illustrates a conventional computer system that is connected to SATA compliant storage devices.
Figure 3:
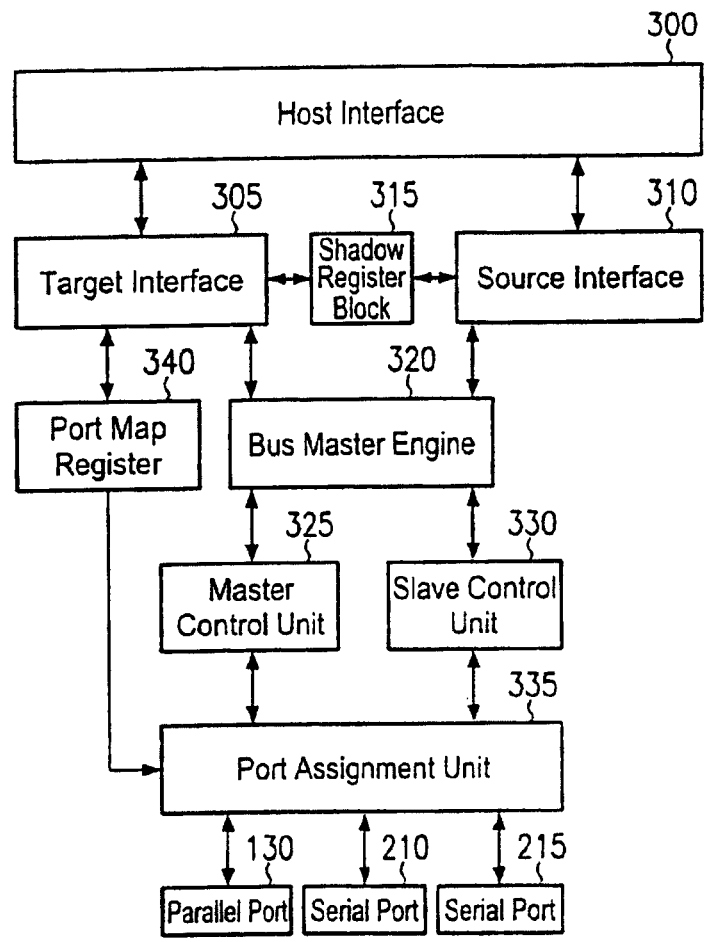
FIG. 3 illustrates the components of an ATA controller according to an embodiment.

Referring now to the drawings and particularly to FIG. 3 which illustrates the hardware components of an ATA controller according to an embodiment, the controller comprises a target interface unit 305 and a source interface unit 310. Both interfaces are connected to the host interface 300 for exchanging requests and data with the software driver 120. The target interface 305 may be used by the driver 120 for accessing the controller for configuration purposes. On the other hand, the source interface 310 may be used to perform data access to read or write data to/from the storage devices.

There is further provided a bus master engine 320 for controlling which one of the master control unit 325 and the slave control unit 330 is granted access to which one of the target interface 305 and the source interface 310, and vice versa. The master control unit 325 and the slave control unit 330 may be built up like in conventional ATA controllers 125 that control a parallel port to which two parallel devices can be connected, one being the master and the other being the slave.

Further, there is a shadow register block 315 provided that includes interface registers used for delivering commands to the devices or posting status from the devices. The shadow register block 315 is so named since it contains a set of registers that shadow the contents of the traditional device registers, for performing standard ATA emulation. In the present embodiment, the controller operates in the master/slave emulation mode specified in the SATA specification, that is, two serial devices on two separate serial ports 210, 215 are represented to host software as a master and a slave accessed at the same set of host bus addresses.

To realize this functionality, there may be provided a port assignment unit 335 which may be used for switching between the parallel and serial ports 130, 210, 215. The port assignment unit 335 further connects the master and slave devices connected to the parallel port 130 to the correct control unit 325, 330. Also, the serial devices connected to the serial ports 210, 215 are connected to either the master control unit 325 or the slave control unit 330, as the controller of the present embodiment operates in the master/slave emulation mode as described above. Another function performed by the port assignment unit 335 is that of the parallel/serial converter 205, i.e., it performs a conversion of parallel to serial data signals and vice versa.

As can be seen from FIG. 3, the port assignment unit 335 receives further input from port map register 340. The port map register 340 which may actually be a set of registers, stores port identification data indicating which one of the parallel and serial ports 130, 210, 215 is activated. It is to be noted, that generally any number of ports may be activated, including the case where no port is active, or where all of the parallel and serial ports are activated.

In another embodiment, the port map register 340 and the port assignment unit 335 may be such that the ATA controller of FIG. 3 can operate in one of the following configurations. In the first configuration, either zero, one or two parallel ATA devices can be driven. In another configuration, either zero, one or two serial ATA devices can be driven. Finally, in a third configuration, one parallel and one serial device can be driven.

It is to be noted that the port map register 340 that stores port identification data defining the ports to be used, or the configuration, is connected to the target interface 305 so that the driver 120 has access to the register(s) to perform a reconfiguration. That is, the embodiment extends an existing parallel ATA controller by a serial part and thus allows reusing a significant amount of parallel ATA controller hardware for implementing a cost effective software configurable combined serial/parallel ATA controller.

The entire controller can be reconfigured to operate as conventional ATA controller, or to operate as conventional SATA controller. That is, a software driven reconfiguration is provided that makes it possible to switch between a mode where the controller behaves like a conventional ATA controller, and a mode where the controller behaves like a conventional SATA controller. Additionally, the controller according to the embodiment can be configured to concurrently perform data transfer to parallel and serial devices. That is, the controller of the embodiment is a chameleon device which adjust to any possible connectivity modes simply by performing a software reconfiguration.

Moreover, in one of the modes, parallel and serial devices can even be operated simultaneously. It is to be noted that the concurrent data transfer to and from a parallel and serial storage devices may be done by expanding the SATA transport layer state machine to be able to use conventional ATA control signals generated by conventional ATA interface control circuits, and to add an additional payload buffer.

As discussed above, the port map register 340 allows the software 100, 105, 110, 115, 120 to configure and reconfigure the arrangement. This includes the configuration of the master or the slave or both devices to either a parallel or a serial device. Moreover, as defined in the SATA specification, the controller may have the registers required to allow read/write processes to the SATA port status and error registers.

Figure 4:
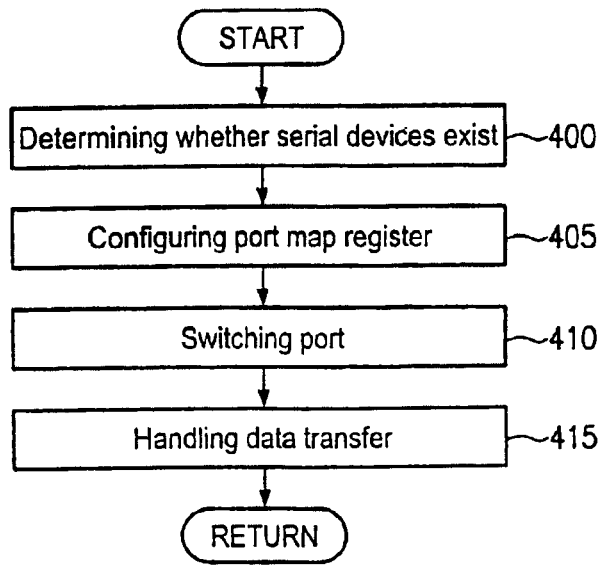
FIG. 4 is a flowchart illustrating the process of operating the ATA controller of FIG. 3.

Turning now to FIG. 4, a flowchart is shown illustrating the process of operating the ATA controller according to the embodiment of FIG. 3. In step 400, the software checks if there are serial ATA drives plugged in, e.g. by reading the SATA port status register. The software then configures the port map register 340 in step 405. It is to be noted that steps 400 and 405 may be performed during initialization of the controller.

In response to an action from driver 120, or in response to a request from one of the storage devices, the port assignment unit 335 may act as port switch unit to switch to the appropriate ports 130, 210, 215 in step 410. If a correct port is already active, this step may be skipped. Once access to the storage device is made possible, the data transfer is performed in step 415.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A control apparatus for controlling data transfer to and/or from storage devices, comprising:
    a first control unit (300–330) for controlling data transfer to and/or from an ATA (Advanced Technology Attachment) compliant parallel storage device (135, 140); and
    a second control unit (335, 340) for controlling data transfer to and/or from an SATA (Serial ATA) compliant serial storage device (220, 225),
    wherein the control apparatus is capable of concurrently performing the data transfer to and/or from said parallel and serial devices.

2. The apparatus of claim 1, wherein said second control unit is arranged for controlling data transfer to and/or from two SATA storage devices in a master/slave emulation mode wherein one of the SATA storage devices is represented to host software as master and the other SATA storage device as slave, both being accessible at the same set of host bus addresses.

3. The apparatus of claim 1, wherein said first control unit is arranged for controlling data transfer to and/or from two parallel ATA storage devices connected to one parallel port, one device being the master and the other being the slave at the parallel port.

4. The apparatus of claim 1, further comprising:
    a port map register (340) storing identification data identifying said parallel and serial devices; and
    a port switch unit (335) for establishing connections to the parallel and serial devices indicated by said identification data.

5. The apparatus of claim 4, wherein said port map register is software rewritable.

6. The apparatus of claim 4, wherein:
    said first control unit is arranged for controlling data transfer to and/or from two ATA storage devices connected to one parallel port, one device being the master and the other being the slave at the parallel port; and
    said port map register is connected to store master/slave identification data identifying which device is the master or slave.

7. The apparatus of claim 1, wherein said first control unit is arranged for controlling data transfer to and/or from two parallel ATA storage devices, and said second control unit is arranged for controlling data transfer to and/or from two SATA storage devices.

8. The apparatus of claim 7, wherein said control apparatus is capable of disabling said first control unit to enable data transfer with SATA storage devices only.

9. The apparatus of claim 7, wherein said control apparatus is capable of disabling said second control unit to enable data transfer with parallel ATA storage devices only.

10. The apparatus of claim 1, arranged for determining if an SATA storage device is connected to the control apparatus.

11. The apparatus of claim 10, arranged for providing information on the determined SATA storage device to host software.

12. The apparatus of claim 1, wherein said second control unit is capable of converting parallel data to serial data and/or serial data to parallel data to enable data transfer to and/or from SATA storage devices.

13. The apparatus of claim 1, being an integrated circuit chip.

14. An integrated circuit chip comprising circuitry for performing data transfer to and/or from ATA (Advanced Technology Attachment) and SATA (Serial ATA) devices, comprising:
    first control circuitry (300–330) for controlling data transfer to and/or from an ATA compliant parallel storage device (135, 140); and
    second control circuitry (335, 340) for controlling data transfer to and/or from an SATA compliant serial storage device (220, 225),
    wherein the first and second control circuitries are capable of concurrently performing the data transfer to and/or from said parallel and serial devices.

15. A method of operating a control apparatus for controlling data transfer to and/or from storage devices, the method comprising:
    performing (415) data transfer to and/or from an ATA (Advanced Technology Attachment) compliant parallel storage device connected to the control apparatus; and
    performing (415) data transfer to and/or from an SATA (Serial ATA) compliant serial storage device connected to the control apparatus;
    wherein the data transfer to and/or from the ATA compliant parallel storage device and the data transfer to and/or from the SATA compliant serial storage device are performed concurrently.

16. The method of claim 15, arranged for controlling data transfer to and/or from two SATA storage devices in a master/slave emulation mode wherein one of the SATA storage devices is represented to host software as master and the other SATA storage device as slave, both being accessible at the same set of host bus addresses.

17. The method of claim 15, arranged for controlling data transfer to and/or from two parallel ATA storage devices connected to one parallel port of the control apparatus, one device being the master and the other being the slave at the parallel port.

18. The method of claim 15, further comprising:
storing identification data in a port map register (340) of the control apparatus, said identification data identifying said parallel and serial devices; and
switching a port of the control apparatus for establishing connections to the parallel and serial devices indicated by said identification data.

19. The method of claim 18, wherein said port map register is software rewritable.

20. The method of claim 18, arranged for controlling data transfer to and/or from two parallel ATA storage devices connected to one parallel port, one device being the master and the other being the slave at the parallel port; and
said port map register stores master/slave identification data identifying which device is the master or slave.

21. The method of claim 15, arranged for controlling data transfer to and/or from two ATA compliant parallel storage devices, and controlling data transfer to and/or from two SATA compliant serial storage devices.

22. The method of claim 15, further comprising:
determining (400) if an SATA storage device is connected to the control apparatus.

23. The method of claim 22, further comprising:
providing information on the determined SATA storage device to host software.

24. The method of claim 15, wherein said step of performing data transfer to and/or from an SATA compliant serial storage device comprises:
converting parallel data to serial data and/or serial data to parallel data.

* * * * *